(12) United States Patent
Flanigan et al.

(10) Patent No.: US 8,034,859 B2
(45) Date of Patent: Oct. 11, 2011

(54) RUBBER COMPOSITIONS CONTAINING AN OIL BLEND OF A PETROLEUM OIL AND A BIOBASED OIL AND METHODS OF MAKING THE SAME

(75) Inventors: Cynthia Mowery Flanigan, Canton, MI (US); Christine Perry, Kingsport, TN (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/692,026

(22) Filed: Jan. 22, 2010

(65) Prior Publication Data

US 2011/0184093 A1 Jul. 28, 2011

(51) Int. Cl.
*C08K 5/00* (2006.01)
*C08L 23/00* (2006.01)
(52) U.S. Cl. ........................... 524/284; 524/274
(58) Field of Classification Search .............. 524/284
See application file for complete search history.

(56) References Cited

U.S. PATENT DOCUMENTS

| | | | |
|---|---|---|---|
| 1,709,241 A * | 4/1929 | Winkelmann | 524/62 |
| 6,210,797 B1 * | 4/2001 | Sato et al. | 428/357 |
| 6,759,456 B2 | 7/2004 | Kikuchi | |
| 7,371,791 B2 * | 5/2008 | Hattori et al. | 524/274 |
| 2005/0282921 A1 * | 12/2005 | Flanigan et al. | 521/99 |
| 2006/0043629 A1 | 3/2006 | Drzal et al. | |
| 2006/0270747 A1 | 11/2006 | Griggs | |
| 2007/0123597 A1 | 5/2007 | Perry et al. | |
| 2007/0173626 A9 | 7/2007 | Geiger et al. | |
| 2007/0275227 A1 | 11/2007 | Mashburn et al. | |
| 2008/0108733 A1 * | 5/2008 | Colvin et al. | 524/25 |
| 2008/0262259 A1 | 10/2008 | Luo et al. | |
| 2009/0263603 A1 * | 10/2009 | Ota et al. | 428/36.9 |

FOREIGN PATENT DOCUMENTS

EP 1790688 A1 5/2007

OTHER PUBLICATIONS

Elsevier Ltd.: Title: Characterization of soy protein isolate/styrene-butadiene rubber composites; United States Department of Agriculture, National Center for Agriculture Utilization Research; Received Mar. 19, 2004; revised Jul. 6, 2004; accepted Jul. 6, 2004. Available online Sep. 16, 2004.
Elsevier; Title: Effect of soy spent flakes and carbon black co-filler in rubber composites; Author: Jong L.; 2007.
ENS Newswire: Title: Cargill Breaks Ground for Soy-Plastics Plant in Chicago; Chicago, Illinois, Jul. 9, 2008 (ENS).
U.S. Department of Agriculture; Title: Viscoelastic Properties of Bio-Based Elastomeric Composites; Location: Cereal Products and Food Science Research; 2006 Annual Report.
Jong, L., USDA Agricultural Research Service, Title: Rheological and Interfacial Properties of Bio-Based Materials and Food Products, Publication Date: Feb. 1, 2007.

* cited by examiner

*Primary Examiner* — Ling Choi
*Assistant Examiner* — Hui Chin
(74) *Attorney, Agent, or Firm* — Damian Porcari; Brooks Kushman P.C.

(57) ABSTRACT

According to at least one aspect of the present invention, a rubber composition is provided. In at least one embodiment, the rubber composition comprises a rubber, an oil blend of a petroleum oil and a bio-based oil, the bio-based oil being non-hydroxyl-functionalized, hydroxyl-functionalized, or combinations thereof; and a filler. In certain instances, the bio-based oil includes a soy oil. In certain other instances, the soy oil is hydroxyl-functionalized having a hydroxyl number of from 10 to 350 KOH/g, 40 to 150 KOH/g, or 25 to 200 KOH/g. According to at least another aspect of the present invention, there is provided a method comprising providing a rubber composition as described herein and molding the rubber composition to form the rubber article.

18 Claims, 6 Drawing Sheets

RUBBER COMPOSITIONS CONTAINING AN OIL BLEND OF A PETROLEUM OIL AND A BIOBASED OIL AND METHODS OF MAKING THE SAME

BACKGROUND

1. Technical Field

The present invention relate to rubber compositions containing an oil blend of a petroleum oil and a bio-based oil, the bio-based oil being non-hydroxyl-functionalized, hydroxyl-functionalized, or combinations thereof. In certain particular instances, the bio-based oil includes a soy oil.

2. Background Art

Typical rubber formulations for automotive applications such as gaskets, floor mats, splash shields and radiator shields use petroleum-derived materials. For example, EPDM (ethylene propylene diene monomer), formulations often incorporate equal portions of petroleum oil, synthetic rubber and carbon black.

Conventional rubber formulations using petroleum oil have been met with limited use. Being derived from petroleum, petroleum oil is a non-renewable resource. Many uncertainties associated with the use of petroleum-derived materials reside in the long-term economic instability and limited reserves of fossil fuels and oils. The production of the petroleum-derived materials requires a great deal of energy, as the raw petroleum oils are drilled, extracted from the ground, transported to refineries, refined, and processed to yield the petroleum oils. These efforts add to the cost of petroleum oils and hence the cost of the final rubber products.

There is a continuing need for "greener" rubber products made from raw materials that are more versatile, renewable, less costly, and more environmental friendly.

SUMMARY

According to at least one aspect of the present invention, a rubber composition is provided. In at least one embodiment, the rubber composition comprises a rubber, an oil blend of a petroleum oil and a bio-based oil, the bio-based oil being non-hydroxyl-functionalized, hydroxyl-functionalized, or combinations thereof; and a filler. In certain instances, the bio-based oil includes a soy oil. In certain other instances, the soy oil is hydroxyl-functionalized having a hydroxyl number of from 10 to 350 KOH/g, 40 to 150 KOH/g, or 25 to 200 KOH/g.

In at least another embodiment, the soy oil, being non-hydroxyl-functionalized and or hydroxyl-functionalized, is 1 to 100% by weight of the total weight of the petroleum oil. In certain particular instances, the soy oil is 10 to 50% by weight of the total weight of the petroleum oil.

In at least yet another embodiment, the rubber is ethylene-propylene ethylene norbornene rubber.

In at least yet another embodiment, the filler is a filler blend of carbon black and an ancilliary filler selected from the group consisting of soy protein, soy flour, soy meal, soy hull, and combinations thereof.

According to at least another aspect of the present invention, a method is provided for forming a rubber article. In at least one embodiment, the method comprises providing a rubber composition containing a rubber, an oil blend of a petroleum oil and a soy oil, the soy oil being non-hydroxyl-functionalized, hydroxyl-functionalized, or combinations thereof; and a filler; and molding the rubber composition to form the rubber article. In at least another embodiment, the step of providing further comprises compounding the rubber, the oil blend and the filler to form the rubber composition at any suitable temperature. In certain particular instances, the step of compounding is carried out at a relatively lower temperature of from 20 to 50° C., 22 to 46° C., or 25 to 40° C. The molding can be carried out at any suitable temperature, and in certain instances, at a temperature of from 130 to 200° C., 140 to 180° C., or 150 to 170° C.

DETAILED DESCRIPTION OF THE PREFERRED EMBODIMENT(S)

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention. Practice within the numerical limits stated is generally preferred.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

As used herein, and unless otherwise noted, the term soy oil refers to non-hydroxyl-functionalized soy oil such as one as extracted from soybean plants, hydroxyl-functionalized soy polyol that has been subject to hydroxyl-functionalization, or combinations thereof.

As used herein, and unless otherwise noted, the term "hydroxyl-functionalized" refers to a reaction or a process whereby one or more hydroxyl groups (—OH) are added to the soy oil molecule.

As used herein, and unless otherwise noted, the term "functionality" refers to an average number of isocyanate reactive sites per molecule of soy polyol. It can be calculated according to the following formula: average functionality=(total moles polyol)/(total moles OH).

As used herein, and unless otherwise noted, the term "hydroxyl number" refers to a measure of the amount of reactive hydroxyl groups available for reaction. By way of example, this value can be determined by a wet analytical method and is reported as the number of milligrams of potassium hydroxide equivalent to the hydroxyl groups found in one gram equivalent of a sample.

According to at least one aspect of the present invention, a rubber composition is provided. In at least one embodiment, the rubber composition includes a rubber, an oil blend of a petroleum oil and a bio-based oil, the bio-based oil being non-hydroxyl-functionalized, hydroxyl-functionalized, or combinations thereof; and a filler. In certain instances, the vegetable oil includes a soy oil. In certain other instances, the soy oil is hydroxyl-functionalized soy polyol having a hydroxyl number of from 10 to 350 KOH/g, 40 to 150 KOH/g, or 25 to 200 KOH/g, and in particular instance, has a hydroxyl number of 50, 167, or 350. In certain particular instances, the rubber composition further includes at least one of the canola oil, castor oil, rapeseed oil, sunflower oil, and any combinations thereof.

It has been surprisingly found that the rubber compositions and rubber articles containing the bio-based oil and particularly the soy oil, is provided with industrially acceptable or better properties while being more economically efficient and more environmentally friendly. Particularly, and as will be detailed herein elsewhere, the rubber compositions and articles have exceptionally good percent elongation, in certain instances greater than 600% that is at least fifty percent more in value than the 400% elongation of a typical rubber article without the soy oil replacement.

As used herein, and unless otherwise noted, the bio-based oil includes vegetable or seed oils such as soy oil, rapeseed oil, canola oil, peanut oil, cotton seed oil, sunflower oil, olive oil, grape seed oil, linseed oil, castor oil; fish oil and oils derived from other animal fats. In certain embodiments, soy oil and corn or cottonseed oils are preferred. In other embodiments, soy oil is particularly preferred.

As used herein, and unless otherwise noted, the term "petroleum oil" refers to naturally occurring mixture of hydrocarbons of various weights, as a result of conventional oil extraction processes known in the art. The hydrocarbon may include alkanes, cycloalkanes, and various aromatic hydrocarbons. The petroleum oil as used herein may include organic compounds such as nitrogen, oxygen, and sulfur, and trace amounts of metals such as iron, nickel, copper, and vanadium. By way of example, the petroleum oil may include 83 to 87 weight percent of carbon, 10 to 14 weight percent of hydrogen, 0.1 to 2 weight percent of nitrogen, 0.5 to 6 weight percent of sulfur, and any combinations thereof.

In certain particular embodiments, the petroleum oil is selected from the group consisting of paraffinic oil, naphthenic oil, aromatic oil, and combinations thereof. In certain particular instances, the petroleum oil as used is a paraffinic oil. The paraffinic oil may be commercially available. Non-limiting examples of the petroleum oils include polyethylene polyol, polypropylene polyol, acrylic polymer polyol, polyolefin polyol, polystyrene polyol. It is appreciated that the petroleum polyols may differ from the soy polyol in that the latter contains one or more triglyceride back bone while the former does not.

It has been found that various rubber products can be formulated by using an oil blend of a petroleum oil and soy oil, including, as defined herein, non-hydroxyl-functionalized soy oil, hydroxyl-functionalized soy polyol, and combinations thereof. There are several distinctive benefits associated with the rubber products thus formulated. For instance, the rubber products have industrially acceptable properties while effecting significant cost savings and alleviating environmental concerns. Inclusion of soy polyols aids in solubility of additives in the rubber mix, effects reduction in blooming, and improving elongation properties of the final rubber products. Moreover, addition of soy polyols improves compounding process with shorter cycle times, lower temperatures, and increased tack in the final rubber product.

Figure 1A:
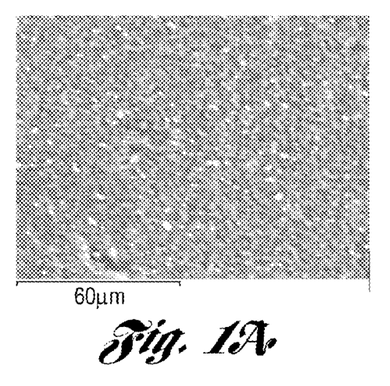
FIG. 1A depicts blooming of additives in a conventional petroleum oil based rubber composition.
Figure 1B:
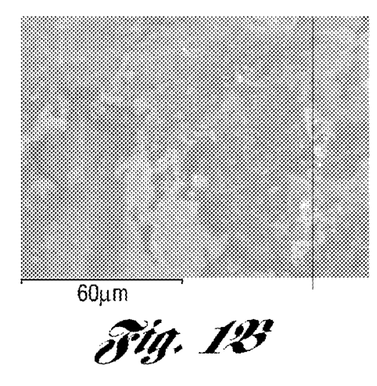
FIG. 1B depicts reduced blooming of additives upon partial replacement with soy polyol having hydroxyl number of 50 KOH/g in comparison to visible blooming of additive observed with control samples without the soy polyol replacement depicted in FIG. 1A.

As illustratively shown in FIGS. 1A and 1B, reduced blooming of additives are evidenced in FIG. 1B upon partial replacement with soy polyol having a hydroxyl-number of 50 KOH/g as compared to the control composition (FIG. 1A) without the soy polyol partial replacement.

Figure 2A:
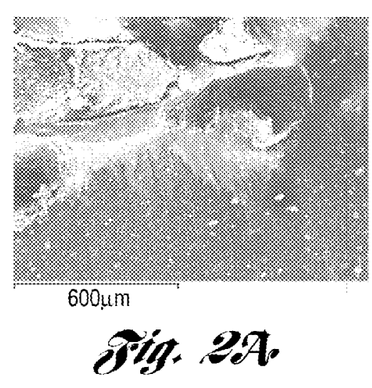
FIGS. 2A and 2B depict surface characterization of EPDM specimen with soy meal filler (FIG. 2A) or soy flour (FIG. 2B) upon liquid nitrogen freeze and manual fracture.
Figure 2B:
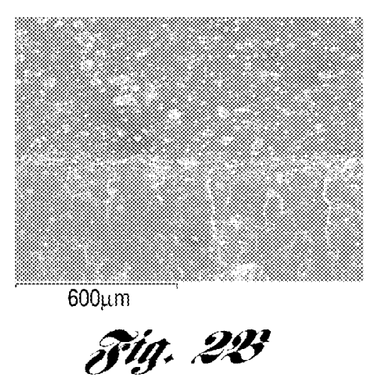

Acceptable surface characterization is illustratively shown in FIGS. 2A and 2B, wherein EPDM specimens with soy meal (FIG. 2A) or soy flour (FIG. 2B) in partial replacement for carbon black are subjected to liquid nitrogen freeze and manual fracture.

Figure 3A:
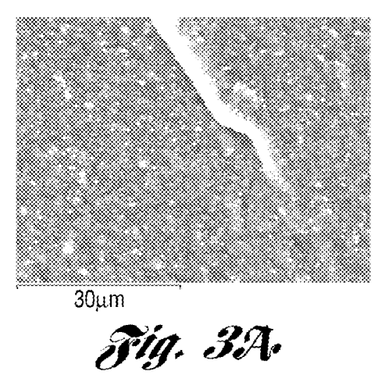
FIGS. 3A and 3B depicts, with 2000× magnification, surface characterization of EPDM specimen containing pure paraffinic oil (FIG. 3A) or containing pure soy polyol of a hydroxyl number of 50 KOH/g (FIG. 3B)
Figure 3B:
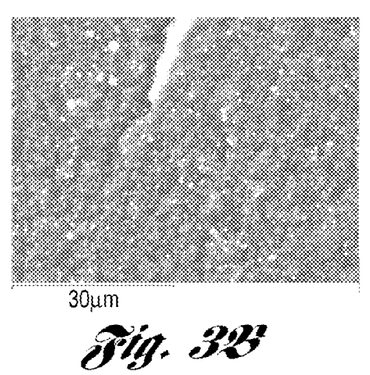

Further as illustratively shown in FIGS. 3A and 3B, improved surface characterization, with a 2000× magnification, is evidenced in an EPDM specimen containing soy polyol having a hydroxyl number of 50 KOH/g (FIG. 3B) as compared to an EPDM specimen containing paraffinic oil alone without the soy polyol partial replacement (FIG. 3A).

It has further been found, with the use of the soy oil as defined herein, rubber products of varying and selectable final properties, including differing elongation values, tear resistance, and hardness, can be made by varying the extent of soy oil and soy polyol substitution and hence the degree of hydroxylation. It would be difficult, if not impossible, to create these variable rubber products using a single petroleum-based oil.

Soy polyol involves relatively less harmful emissions during rubber formulations than the petroleum oil used alone. There is an estimate of about 5.5 kilograms of carbon dioxide reduction per kilogram polyol produced from soybeans relative to petroleum sources as soybeans sequester carbon dioxide during growth. Moreover, because soy polyols are produced from plants, they are a renewable raw material and are thus more environmentally friendly.

The inclusion in the rubber composition of the non-functionalized soy oil and or the hydroxyl-functionalized soy polyol also realizes significant cost savings. Soybean oils are abundant, renewable, and easily processed commodities, as opposed to petroleum derivatives and which entail significant associated processing costs. As such, they may currently be acquired for a cost of approximately half that of average grade petroleum-based polyester or polyether polyols, and approximately one quarter the cost of high-grade petroleum-based polyester or polyether polyols. Currently, rubber such as EPDM costs approximately $1.15~1.25 per pound and carbon black costs $0.88-$14.00 per pound. In comparison, for partial replacement for the carbon black soy meal costs only $0.06~$0.09 per pound and soy flour cost $0.12~$0.14 per pound. Similarly, in partial replacement for the petroleum oil, soy oil costs about $0.25 per pound.

As a natural source for the soy oil and soy polyol, the soybean or soya bean is characterized as a bushy, green legume related to clover, peas and alfalfa. The pods, stems and leaves are covered with fine brown or gray hairs. Together, oil and protein account for about 60% of dry soybeans by weight; protein at 40% and oil at 20%. The remainder consists of 35% carbohydrate and about 5% ash. The principal soluble carbohydrates, saccharides, of mature soybeans are the disaccharide sucrose (range 2.5-8.2%), the trisaccharide raffinose (0.1-1.0%) composed of one sucrose molecule connected to one molecule of galactose, and the tetrasaccharide stachyose (1.4 to 4.1%) composed of one sucrose connected to two molecules of galactose. Because soybeans contain no starch, they are a good source of protein for diabetics.

The non-hydroxyl-functionalized soy oil can be isolated or extracted from the soybeans using any suitable methods, including the solvent extraction method. In particular, the soybeans are cracked, adjusted for moisture content, rolled into flakes and solvent-extracted with commercial hexane. The oil is then refined, blended for different applications. In general, the major unsaturated fatty acids in soybean oil triglycerides are 7% linolenic acid (C-18:3); 51% linoleic acid (C-18:2); and 23% oleic acid (C-18:1). It also contains the saturated fatty acids 4% stearic acid and 10% palmitic acid.

The soy oil as directly isolated and extracted from the soybeans, like most other vegetable oils, contain no hydroxyl groups in their triacylglycerol structures of saturated and unsaturated fatty acids. For example, crude soy oil consists of about 17 percent saturated triglycerides and about 83 percent unsaturated triglycerides, with about 4.41 double bonds per triglyceride molecule.

The hydroxyl-functionalized soy polyol can be derived from the extracted soy oil using any suitable methods. For instance, to convert the extracted soy oil into soy polyol, hydroxyl groups can be added onto the fatty acid backbone of the extracted soy oil via methods including blowing air through a soy oil, heating the soy oil to an elevated temperature over room temperature and/or adding a catalyst to promote hydroxylation reaction in the soy oil.

It is noted that hydroxyl functionalization is carried out on soy oils that have been extracted out. Any oil molecules incidentally retained within the soy meal, soy flour, soy hull, soy protein, or other soy remnants after oil extraction cannot be effectively hydroxylated. Therefore, incidental inclusion of soy oil from soy meal, soy flour, or soy protein is not expected to realize any sizable effects otherwise seen according to one or more embodiments of the present invention.

The extracted soy oil and or the hydroxyl-functionalized soy polyol contain primarily triglycerides of fatty acids, which are composed of a carboxyl group attached to a longer chain of hydrocarbons; can be saturated, that is they do not contain any carbon-carbon double bonds, or unsaturated such that they contain carbon-carbon double bonds. The non-hydroxyl-functionalized soy oil as extracted and the hydroxyl-functionalized soy polyol may each have a different distribution and concentration of carbon-carbon double bonds and hydroxyl groups; and as a result, each may give the final rubber product different characteristics with respect to reaction speed and completion, viscosity, and composition. Without being limited to any particular theories, there and other differences remain to be what distinguish the isolated soy oil component from the conventional petroleum oil as used as the sole oil component in the conventional rubber products.

The hydroxyl-functionalized soy polyol, as used according to one or more embodiments of the present invention, can be obtained commercially, for instance, under the brand name SoyOyl® R2-052 available from Urethane Soy System Company (USSC). SoyOyl® R2-052 is a two-functional polyol made from unmodified soy oil.

The hydroxyl-functionalized soy polyol is optionally further processed to reduce volatile contents from the soy polyol. For instance, a vacuum stripping technique can be utilized, such as a wiped film evaporator method, to separate volatiles from the polyol. The soy polyol can be introduced into a heated cylindrical vacuum chamber and through thin-film wiping or sweeping actions, the volatiles vaporize and condense on the inner wall of the vacuum chamber. The condensed liquid, which contains mostly volatile compounds, can be removed.

The hydroxyl-functionalized soy polyol is optionally further processed to include antioxidants to prevent further oxidation across unreacted double bonds in the polyol. Adding antioxidants helps to reduce formation of aldehydes. Non-limiting examples of antioxidants that can be used in accordance with the present invention include PUR68 and PUR55, available from Ciba Specialty Chemicals of Charlotte, N.C.

The hydroxyl-functionalized soy polyol can have any suitable molecular weight, as defined as conventional number-average molecular weight. The molecular weight of a given soy polyol can be measured using a Waters gel permeation chromatograph equipped with Waters 2487 dual λ absorbance detector, a Waters 2414 refractive index detector, and two Waters Styragel® HR 1 THF columns. The flow rate of the tetrahydrofuran eluent can be set at 1 mL/min, at 40° C. Polystyrene standards with narrow molecular weight distributions can be used for molecular weight calibration and, therefore, the molecular weight results are relative molecular weights. Exemplary polystyrene standards have molecular weight of $0.93 \times 10^3$, $1.05 \times 10^3$, $1.26 \times 10^3$, $1.31 \times 10^3$, $1.99 \times 10^3$, $2.97 \times 10^3$, $3.37 \times 10^3$, $4.49 \times 10^3$, $4.92 \times 10^3$, and $5.03 \times 10^3$ Daltons.

According to one or more embodiments of the present invention, the hydroxyl-functionalized soy polyol has functionality in a range of 1.0 to 5.0, and in particular instances, has functionality of 1.0, 1.3, 1.5, 1.8, 2.8, 3.0, 3.5, or 4.0.

According to one or more embodiments of the present invention, the collective amount of the soy oil and/or the soy polyol is 1 to 100% by weight of the total weight of the petroleum oil. In certain particular instances, the collective amount of the soy oil and/or the soy polyol is 10 to 50% by weight of the total weight of the petroleum.

According to one or more embodiments of the present invention, the filler is carbon black or a filler blend of carbon black and an ancillary filler selected from the group consisting of soy protein, soy meal, soy flour, soy hull, and combinations thereof.

The soy protein as used herein is a rigid material with a shear elastic modulus of approximately 2 GPa. The dry soy protein contains functional groups, such as carboxylic acids and substituted amine groups which may make coupling with coupling agents. Various forms of dry soy protein can be used, including those available under the brands of PRO-FAM®, ARDEX®F, ARCON®, TVP®, and SOYLEC®.

The soy protein may be ground to any suitable size. In particular instances, the dry soy protein can be ground to sizes in a range of 10 to 150 microns, 20 to 140 microns, 30 to 130 microns, or 40 to 120 microns. For comparison purposes, conventional carbon black are of sizes in a range of 10 to 60 nanometers.

The dry soy protein can be incorporated into the rubber composition by any conventional means, such as dry mixing or using a masterbatch. The masterbatch can be made by mixing the protein containing material into a latex (in the case of emulsion polymers) or a rubber dissolved in a solution (in the case of solution polymers such as SSBR or polybutadiene) followed by coagulation and drying. The coupling agent can be incorporated in the dry mix, as used in conventional silica mixing or could be used to treat an aqueous suspension of the protein containing filler prior to mixing into a latex or solution of rubber for the masterbatch.

The dry soy protein is optionally chemically modified. For instance, Wu et al., (Studies on the toughness and water resistance of zein-based polymers by modification, Polymer, 44, 3901-3908 (2003)) modified protein by using low molecular weight polycaprolactone (PCL)/hexamethylene diisocyanate (HDI) prepolymer. Through a chemical reaction between the amino acid in the protein, and HDI modified PCT, a urea-urethane linkage in the protein and PCL prepolymer complex can be formed, leading to an increase in toughness and water resistance of the modified soy protein. The dry soy protein as the filler can also be enzymatically modified. For instance, Kumar et al. discloses soy protein-based films "Effect of enzymatic hydrolysis on mechanical properties and fungus growth."

The soybean meal, as used in one or more embodiments of the present invention, refers to the material remaining after solvent extraction of oil from soybean flakes, with a 50% soy protein content. The meal is "toasted" with moist steam and ground in a hammer mill. Soybean meal is an essential element of the American production method of growing farm animals such as poultry and swine on an industrial scale that began in the 1930s; and more recently in the aquaculture of catfish. Ninety-eight percent of the U.S. soybean crop is used for livestock feed.

The soy flour, as used in one or more embodiments of the present invention, refers to defatted soybeans where special care is taken during desolventizing (not toasted) in order to minimize denaturation of the protein to retain a high Nitrogen Solubility Index (NSI), for uses such as extruder texturizing (TVP). It is the starting material for production of soy concentrate and soy protein isolate. The soy flour can be conventionally made. In particular, defatted soy flour is obtained from solvent extracted flakes, and contains less than 1% oil.

According to one or more embodiments of the present invention, the rubber composition includes an inorganic filler. Examples of the inorganic filler are carbon black, silica, calcium carbonate, sericite, alumina, magnesium carbonate, titanium oxide, clay, talc, magnesium oxide, and aluminum hydroxide. Among these, silica, calcium carbonate, sericite, alumina, magnesium carbonate, titanium oxide, clay, talc, magnesium oxide, and aluminum hydroxide are preferable from the viewpoints that environments can be considered and effects due to the terpene copolymer is easily enlarged.

The rubber as used herein according to one or more embodiments of the present invention, include all of the conventional elastomers such as natural rubber, solution styrene butadiene rubber (SBR), emulsion SBR, butadiene rubber (BR), butyl rubber (IIR), styrene isoprene butadiene rubber (SIBR), polybutadiene, isoprene-butadiene rubber (IBR), acrylonitrile butadiene rubber (NBR), chloroprene rubber, ethylene propylene diene monomer (EPDM), and combinations thereof. In certain particular instances, the rubber is ethylene-propylene ethylidene norbornene.

The rubber composition may be formed into articles of various shapes and for different uses. These articles include gaskets, floor mats, splash shields, and radiator shields.

The rubber article as described herein can be used for both interior and exterior vehicle applications, wherein the rubber article has one or more of the following characteristics: a percent elongation of greater than 150%, 250%, 350%, 450%, or 550%; a tensile strength of greater than 5 MPa, 5.5 MPa, 6 MPa, or 6.5 MPa; a tear resistance of greater than 25 KN/m, 30 KN/m, 35 KN/m, 40 KN/m, or 45 KN/m; and a hardness value of greater than 60 Shore A, 65 Shore A, 70 Shore A, or 75 Shore A. In accessing these various properties of the rubber articles, the following methods can be illustratively employed: ASTM D412 for measuring tensile strength and percent elongation, ASTM D624 for measuring tear resistance, and ASTM D2240 for measuring hardness.

In particular, tensile strength and percent elongation (% elongation) can be measured in accordance with ASTM D412. Specimens with one inch grip width and 5.5 inches in total length are stamped from 12.5 millimeter thick slabs using a tensile bar die. An Instron Model 5565 with 500N load cell in a tensile geometry is used to pull the samples at a cross-head velocity of 50 mm/min. Tensile strength and % elongation values are recorded for approximately five samples per set.

Having generally described several embodiments of this invention, a further understanding can be obtained by reference to certain specific examples which are provided herein for purposes of illustration only and are not intended to be limiting unless otherwise specified.

EXAMPLE

Example 1

Various testing specimens are prepared using the formulations shown in Table 1. As employed herein, the sign "/" shown in Tables 1-4 is indicative that a particular ingredient is not used.

TABLE 1

|  | Ingredients | C-1 | S-1A | S-1B | S-1C |
|---|---|---|---|---|---|
| Rubber | Royalene 512 | 100 | 100 | 100 | 100 |
| Filler | Soy Flour | / | / | 52.5 | / |
|  | Soy Meal | / | / | / | 52.5 |
|  | Carbon Black | 105 | 105 | 52.5 | 52.5 |
| Petroleum Oil | Sunpar 2280 | 70 | 35 | 35 | 35 |
| Soy Oil Component | Non-Functionalized soy oil | / | 35 | / | 35 |
|  | Functionalized Soy oil 50 KOH/g polyol | / | 35 | 35 | / |
| Additives | Zinc Oxide | 5 | 5 | 5 | 5 |
|  | Naugex MBTSW | 3 | 3 | 3 | 3 |
|  | Stearic Acid | 1.5 | 1.5 | 1.5 | 1.5 |
|  | Butazate | 1.8 | 1.8 | 1.8 | 1.8 |
|  | Sulfur | 0.8 | 0.8 | 0.8 | 0.8 |

All testing specimens shown in Table 1 each have Royalene 512 (EPDM) from Lion Copolymer as the rubber, have carbon black from Cabot as reinforcing filler, have various contents of Sunpar 2280 from Exxon as paraffinic oil plasticizer, have zinc oxide as the activator, have Naugex MBTSW from Chemtura as the thiazole accelerator, have stearic acid from Aldrich as dispersing softener, have Butazate from Chemtura as a cross-linking accelerator, and sulfur from Chemtura as vulcanizing agent.

The rubber blocks of Royalene 512 are chopped with Guillotine. All ingredients are weighted using triple beam balance or Mettler PJ3000 scale. In weighing the ingredients, caution is taken as carbon black and other powders fly around and sulfur accelerators are toxic via absorption through human skin.

The ingredients are sequentially mixed in an upside-down method. Generally, carbon black and oil are first mixed for 30 seconds, to which is added stearic acid and zinc oxide to be mixed for another 30 seconds, to which then is added Royalene 512 to be mixed for another 240 seconds, to which is then added Naugex and Butazate to be mixed for another 60 seconds, to which is then added Tuex and sulfur for another 60 seconds. Temperature of the mixture varies as components are added. No heating or cooling is provided to the mixture.

In accessing various properties of the testing specimens, the following methods are used: ASTM D412 for measuring tensile strength and percent elongation, ASTM D624 for measuring tear resistance, and ASTM D2240 for measuring hardness, and ASTM D792 for measuring density.

In particular, for tensile testing, test specimens are die-cut using Die C, and tested at room temperature with a Model #3366 Instron load frame at a rate of 500 mm/min. Elongation of the rubber is determined using a long travel extensometer. For testing tear resistance, test specimens are die-cut using Die B of ASTM 624 and are notched with a razor blade under oil with a nicking device. Specimens are tested at a separation rate of 500 mm/min at room temperature. For testing percent elongation, specimens are tested using a long travel extensometer.

Figure 4:
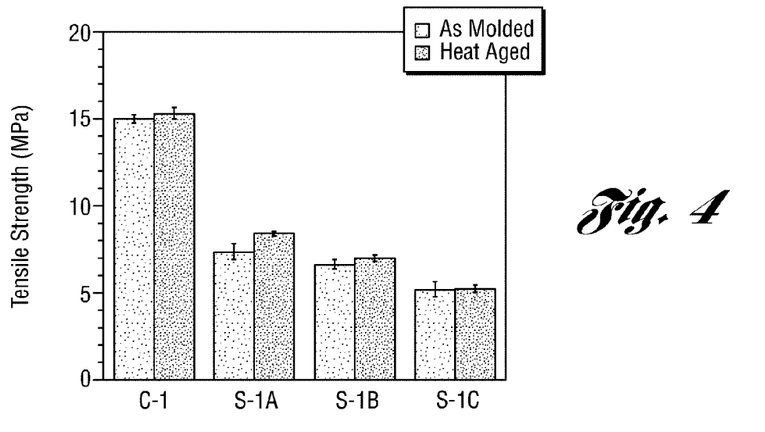
FIG. 4 depicts tensile strength in MPa compared among the control and the treated A-C, and compared between as molded and after heat aging.

FIG. 4 depicts tensile strength in MPa compared among the specimens formulated according to Table 1, and compared between as molded and after heat aging. For heat aging, relevant specimens are subjected to a temperature of 70 degrees Celsius (° C.) for 7 days.

As shown in FIG. 4, assuming a tensile strength value of 5 MPa be acceptable for general use purposes, specimens S-1A, S-1B, and S-1C all exhibit acceptable tensile strength with the exception of S-1C, which shows a tensile strength value at the borderline level of 5 MPa.

Figure 5:
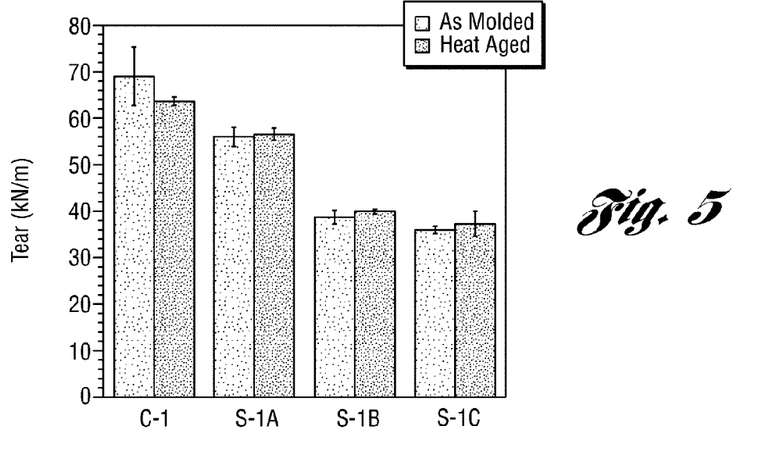
FIG. 5 depicts tear resistance in kN/m compared among the control and the treated samples A-C, with or without heat aging.

FIG. 5 depicts tear resistance in kN/m compared among the specimens formulated according to Table 1, with or without heat aging. Assuming a tear resistance value of 26 kN/m being acceptable for general use purposes, treated specimens S-1A, S-1B, and S-1C all exhibit acceptable tensile strength.

Figure 6:
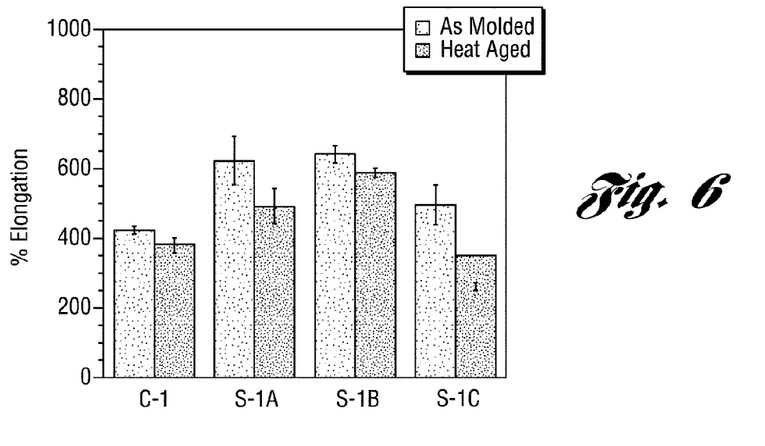
FIG. 6 depicts % elongation compared among the control and the treated specimens A-C, with or without heat aging.

FIG. 6 depicts percent (%) elongation compared among the specimens formulated according to Table 1, with or without heat aging. Assuming a % elongation value of 150% being acceptable for general use purposes, specimens S-1A, S-1B, and S-1C all exhibit exceptional % elongation values, outperforming the control specimen C-1.

Figure 7:
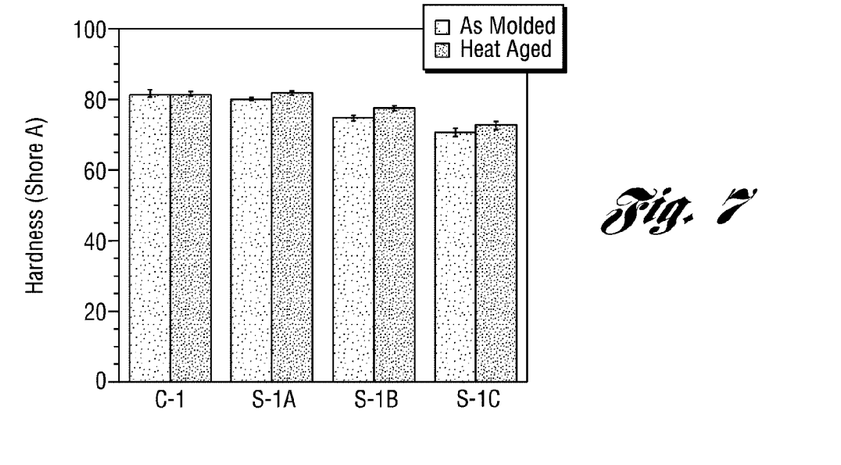
FIG. 7 depicts hardness in Shore A compared among the control and the treated specimens A-C, with or without heat aging.

FIG. 7 depicts hardness in Shore A compared among the specimens formulated according to Table 1, with or without heat aging. As can be seen from FIG. 7, specimens S-1A, S-1B, and S-1C all have acceptable hardness values comparable to that of the control specimen C-1.

Example 2

Specimens containing hydroxyl-functionalized soy oil (soy polyol) of various hydroxyl numbers are prepared using the formulations shown in Table 2.

Specimen preparation and testing methods are the same as those described in Example 1.

TABLE 2

|  | Ingredients | C-2 | S-2A | S-2B | S-2C |
|---|---|---|---|---|---|
| Rubber | Royalene 512 | 100 | 100 | 100 | 100 |
| Filler | Soy Flour | / | / | / | / |
|  | Soy Meal | / | / | / | / |
|  | Carbon Black | 105 | 105 | 105 | 105 |
| Petroleum Oil | Sunpar 2280 | 70 | 47 | 47 | 47 |
| Soy Oil Component | Non-Functionalized soy oil | / | / | / | 23 |
|  | Functionalized Soy oil 50 KOH/g polyol | / | 23 | / | / |
|  | Functionalized Soy oil 167 KOH/g polyol | / | / | 23 | / |
| Additives | Zinc Oxide | 5 | 5 | 5 | 5 |
|  | Naugex MBTSW | 3 | 3 | 3 | 3 |
|  | Stearic Acid | 1.5 | 1.5 | 1.5 | 1.5 |
|  | Butazate | 1.8 | 1.8 | 1.8 | 1.8 |
|  | Sulfur | 0.8 | 0.8 | 0.8 | 0.8 |

Figure 8:
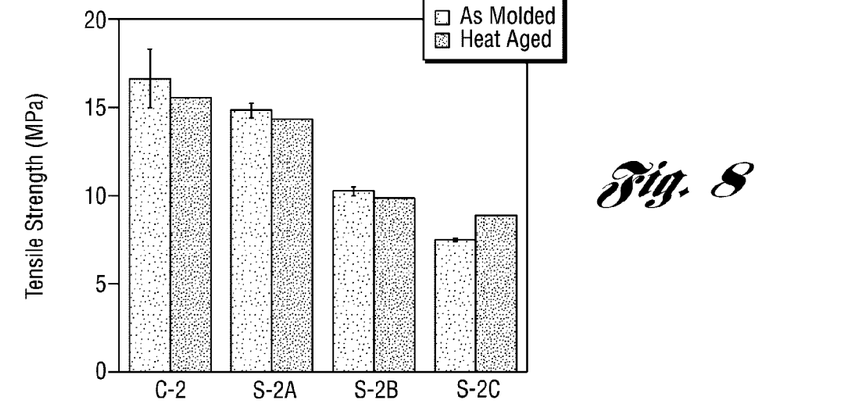
FIG. 8 depicts tensile strength in MPa compared among the control and the treated specimens A-C of Table 2, with or without heat aging.

FIG. 8 depicts tensile strength in MPa compared among the specimens formulated according to Table 2, with or without heat aging. Assuming a tensile strength value of 5 MPa be acceptable for general use purposes, specimens S-2A, S-2B, and S-2C all exhibit acceptable tensile strength with the specimen S-2A containing soy polyol of 50 KOH/g being the most comparable to the control C-2.

Figure 9:
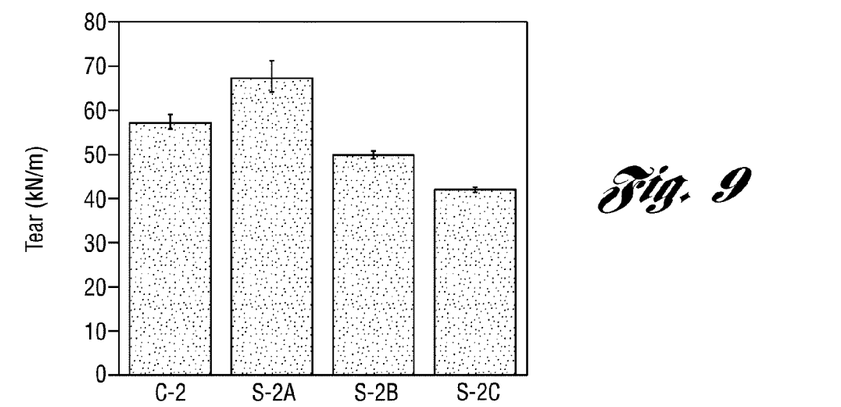
FIG. 9 depicts tear resistance in kN/m compared among the control and the treated specimens.

FIG. 9 depicts tear resistance in kN/m compared among the specimens formulated according to Table 2. Assuming a tear resistance value of 26 kN/m as being acceptable for general use purposes, specimens S-2A, S-2B, and S-2C all exhibit acceptable tear resistance with the specimen S-2A containing soy polyol of 50 KOH/g being most comparable to or outperforming the control specimen C-2.

Figure 10:
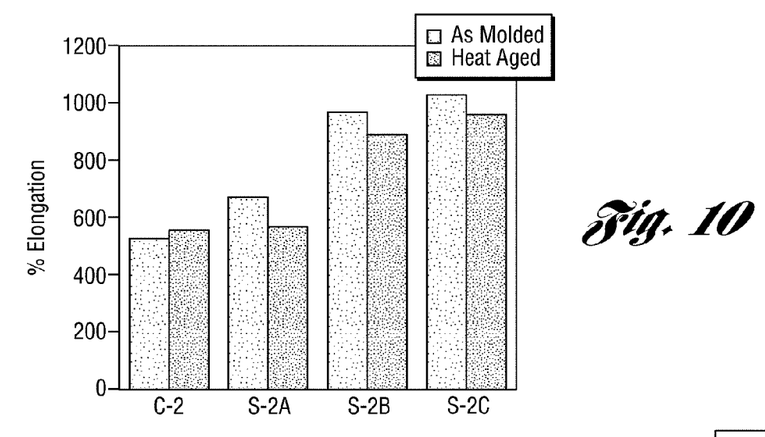
FIG. 10 depicts % elongation compared among the control and the treated specimens containing 33% by weight of soy polyol having various hydroxyl numbers, with or without heat aging.

FIG. 10 depicts % elongation compared among the specimens formulated according to Table 2, with or without heat aging. Assuming a % elongatin value of 150% being acceptable for general use purposes, specimens S-2A, S-2B, and S-2C all exhibit exceptional % elongation values, outperforming the control specimen C-2.

Figure 11:
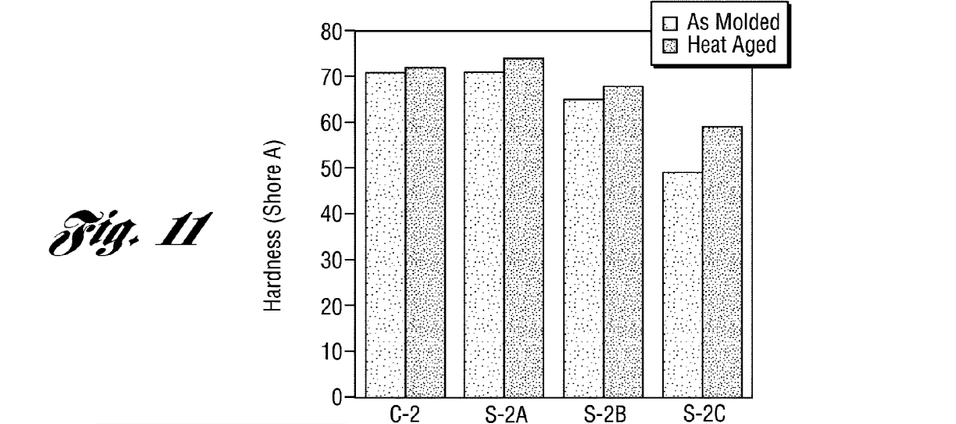
FIG. 11 depicts hardness measured in Shore A compared among the control and the treated specimens containing 33% by weight of soy polyol having various hydroxyl numbers, with or without heat aging.

FIG. 11 depicts hardness measured in Shore A compared among the specimens formulated according to Table 2, with or without heat aging. As can be seen from FIG. 11, specimens S-2A, S-2B, and S-2C all have acceptable hardness values comparable to that of the control specimen C-2.

Figure 12:
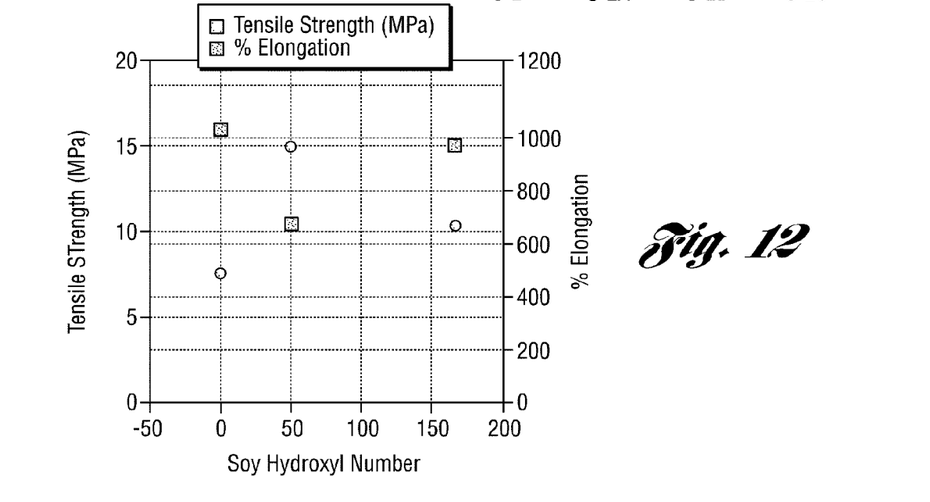
FIG. 12 shows a plot of tensile strength and % elongation values as depicted in FIGS. 8 and 10.
Figure 13:
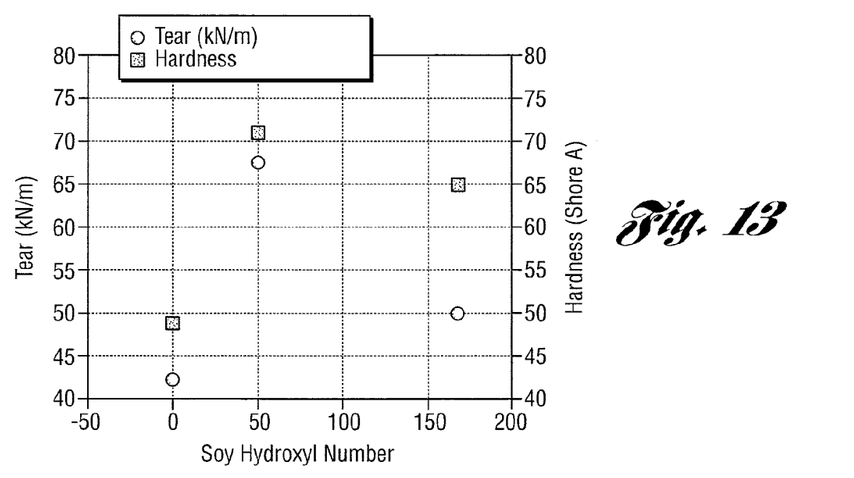
FIG. 13 shows a plot of tear and hardness values as depicted in FIGS. 9 and 11.
Figure 14:
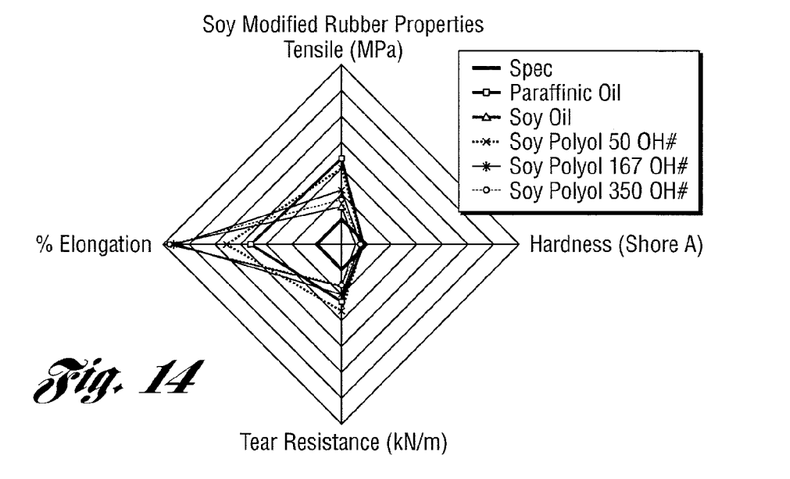
FIG. 14 depicts collectively values for % elongation, tensile, tear resistance, and hardness, compared among the control and the treated specimens containing 33% by weight of soy polyol having various hydroxyl numbers.

Data from FIGS. 8, 9, 10 and 11 are re-plotted in FIGS. 12, 13 and 14, which can be used as a reference data sheet, aiding in parameter look up. For instance, if elongation is valued more than tensile strength, a non-hydroxyl functionalized soy oil having zero hydroxyl number may be used in combination with the petroleum oil in forming the rubber composition. Likewise, if tensile strength is valued more than percent elongation, a soy polyol having hydroxyl number of 50 KOH/g may be used in combination with the petroleum oil for forming the rubber composition or rubber article.

Example 3

This example uses a different EPDM rubber Royalene 552 as the rubber. Specimens are prepared according to the formulations shown in Table 3.

Specimen preparation and testing methods are the same as those described in Example 1.

Figure 15:
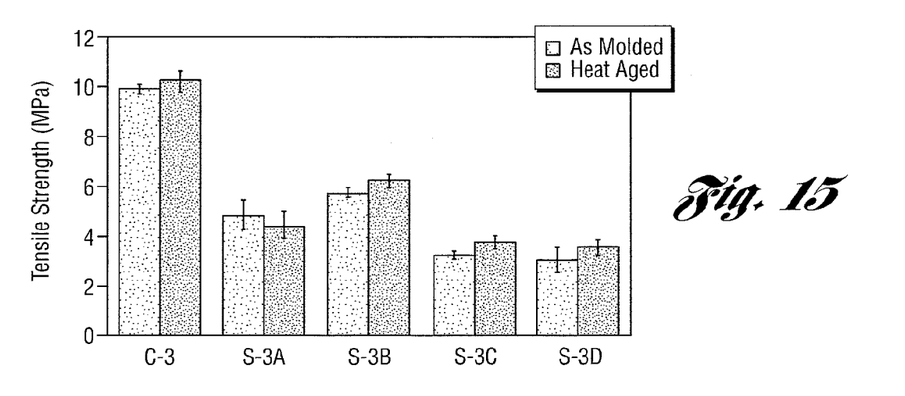
FIG. 15 depicts tensile strength in MPa compared among the control and the treated specimens A-D of Table 3, with or without heat aging.

FIG. 15 depicts tensile strength in MPa compared among the specimens formulated according to Table 3, with or without heat aging. Assuming a tensile strength value of 5 MPa be acceptable for general use purposes, specimens S-3A and S-3B both exhibit acceptable tensile strength, whereas specimens S-3C and S-3D fail the tensile strength test. It appears a concurrent partial replacement by polyol and soy mean tend to greatly reduce tensile strength in comparison to the conventional control.

Figure 16:
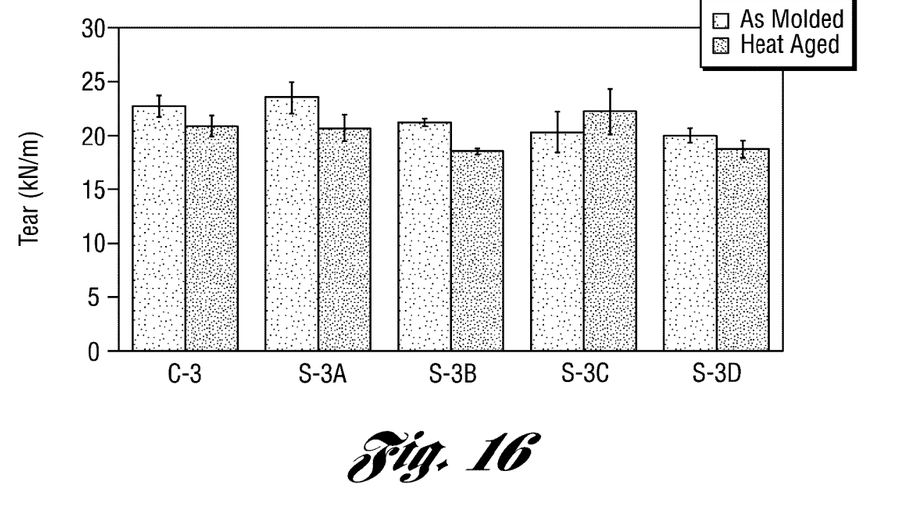
FIG. 16 depicts tear resistance in kN/m compared among the control and the treated specimens, with or without heat aging.

FIG. 16 depicts tear resistance in kN/m compared among the specimens formulated according to Table 3, with or without heat aging. Assuming a tear resistance value of 15kN/m as being acceptable for general use purposes, all specimens seem to have passed the tear resistance test.

TABLE 3

| | | Specimens | | | | |
|---|---|---|---|---|---|---|
| Ingredients | | C-3 | S-3A | S-3B | S-3C | S-3D |
| Rubber | Royalene 552 | 100 | 100 | 100 | 100 | 100 |
| Filler | Soy Flour | 60 | / | 60 | / | 30 |
| | Soy Meal | / | 60 | / | 60 | 30 |
| | Carbon Black | 60 | 60 | 60 | 60 | 60 |
| Petroleum Oil | Sunpar 2280 | 58 | 58 | 29 | 29 | 29 |
| Soy Oil Component | Non-Functionalized soy oil | / | / | / | / | / |
| | Functionalized Soy oil 50 KOH/g polyol | / | / | 29 | 29 | 29 |
| Additives | Zinc Oxide | 5 | 5 | 5 | 5 | 5 |
| | Naugex MBTSW | 3 | 3 | 3 | 3 | 3 |
| | Stearic Acid | 1.5 | 1.5 | 1.5 | 1.5 | 1.5 |
| | Butazate | 1.8 | 1.8 | 1.8 | 1.8 | 1.8 |
| | Sulfur | 0.8 | 0.8 | 0.8 | 0.8 | 0.8 |

Figure 17:
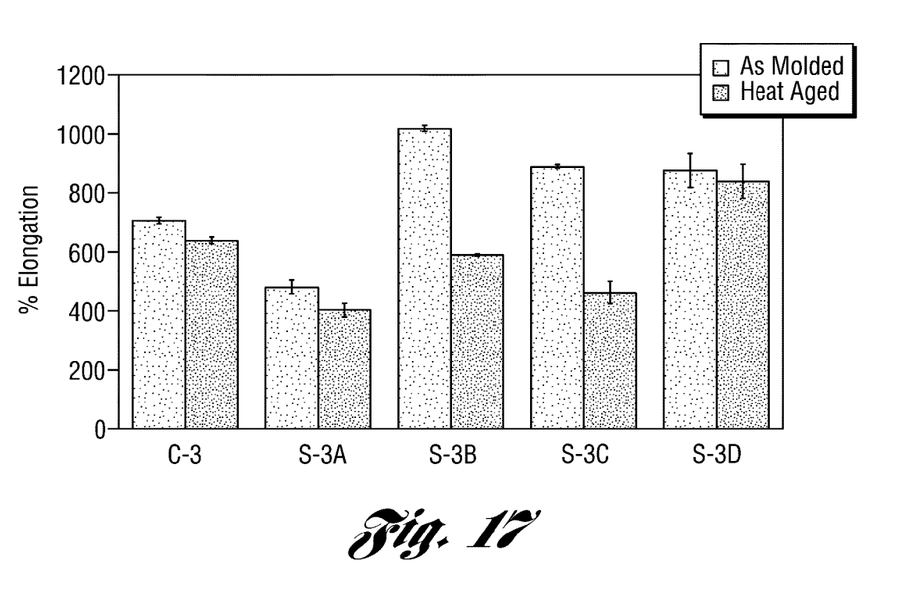
FIG. 17 depicts % elongation compared among the control and the treated specimens A-D, with or without heat aging.

FIG. 17 depicts % elongation compared among the specimens formulated according to Table 3, with or without heat aging. Assuming a % elongation value of 150% being acceptable for general use purposes, all tested specimens S-3A to S-3D all exhibit exceptional % elongation values, with specimens B-C which present 50% polyol replacement outperform the conventional control.

Example 4

This example uses EPDM rubber Royalene 512 as the rubber. Specimens are prepared according to the formulations shown in Table 4.

Method for specimen preparation is the same as that described in Example 1. Cure time at 160 degrees Celsius is tested for each of the specimens using a shear rheometer with a rotating disc. The cure time is measured as the time needed to reach 90 percent of complete cure, or commonly known as t90 cure time.

The data indicates that partial replacement with soy polyol, soy oil, or soy filler including soy meal and soy flour, helps to reduce the needed molding time to cure the rubber.

TABLE 4

| | | | Soy Oil Component | | | | Filler | | |
|---|---|---|---|---|---|---|---|---|---|
| | | Sunpar 2280 | Non- | Functionalized | Functionalized | Functionalized | | | |
| Specimens | T90 Cure (min) | (petroleum oil) | Functionalized Soy Oil | Soy Oil 50 KOH/g Polyol | Soy Oil 167 KOH/g Polyol | Soy Oil 347 KOH/g Polyol | Carbon Black | Soy Flour | Soy Meal |
| C-1 | 12.8 | 24% | / | / | / | / | 36% | / | / |
| S-1A | 7.4 | 16% | 8% | / | / | / | 36% | / | / |
| S-1B | 5.9 | 16% | / | 8% | / | / | 36% | / | / |
| S-1C | 6.8 | 16% | / | / | 8% | / | 36% | / | / |
| S-1D | 5.7 | 16% | / | / | / | 8% | 36% | / | / |
| S-1E | 7.5 | 24% | / | / | / | / | 18% | 18% | / |
| S-1F | 8.2 | 24% | / | / | / | / | 18% | / | 18% |
| S-1G | 6.3 | 16% | / | 8% | / | / | 18% | 18% | / |
| S-1H | 7.9 | 16% | / | 8% | / | / | 18% | / | 18% |
| S-1I | 7.3 | 16% | / | 8% | / | / | 18% | 9% | 9% |

While the best mode for carrying out the invention has been described in detail, those familiar with the art to which this invention relates will recognize various alternative designs and embodiments for practicing the invention as defined by the following claims.

What is claimed is:

1. A rubber composition comprising:
   a rubber;
   an oil blend of a petroleum oil and a soy oil including both non-hydroxyl-functionalized soy oil and hydroxyl-functionalized soy polyol; and
   a filler.

2. The rubber composition of claim 1, wherein the hydroxyl-functionalized soy polyol includes a hydroxyl number of from 10 to 350 KOH/g.

3. A rubber composition comprising:
   a rubber;
   an oil blend of a petroleum oil and a soy oil, wherein the soy oil is 10 to 50 percent by weight of the total weight of the petroleum oil.

4. The rubber composition of claim 1, wherein the rubber is ethylene-propylene ethylidene norbornene rubber.

5. The rubber composition of claim 1, wherein the petroleum oil is paraffinic oil.

6. The rubber composition of claim 1, wherein the filler is a filler blend containing carbon black and an ancillary filler selected from the group consisting of soy protein, soy flour, soy meal, soy hull, and combinations thereof.

7. The rubber composition of claim 6, wherein the ancillary filler is 10 to 50 percent by weight of the total weight of the carbon black.

8. A rubber article for use in an automotive vehicle, comprising:
   a rubber;
   a filler; and
   an oil blend of a petroleum oil and a soy oil, the soy oil being non-hydroxyl-functionalized, hydroxyl-functionalized, or combinations thereof, wherein the soy oil is 10 to 50 percent by weight of the total weight of the petroleum oil.

9. The rubber article of claim 8, wherein the filler is a filler blend of carbon black and an ancillary filler selected from the group consisting of soy protein, soy flour, soy meal, soy hull, and combinations thereof.

10. The rubber article of claim 8, wherein the soy oil is hydroxyl-functionalized having a hydroxyl number of from 25 to 200 KOH/g.

11. The rubber article of claim 8, wherein the rubber is ethylene-propylene ethylidene norbornene rubber.

12. The rubber article of claim 8, wherein the petroleum oil is paraffinic oil.

13. The rubber article of claim 9, wherein the ancillary filler is 10 to 50 percent by weight of the total weight of the carbon black.

14. The rubber article of claim 8 formed as a gasket, floor mat, splash shield, or a radiator shield.

15. A method of forming a rubber article comprising:
   providing a rubber composition containing a rubber; an oil blend of a petroleum oil and a soy oil including non-hydroxyl-functionalized soy oil and hydroxyl-functionalized soy polyol; and a filler; and
   molding the rubber composition to form the rubber article.

16. The method of claim 15, wherein the step of providing further comprising compounding the rubber, the oil blend and the filler to form the rubber composition.

17. The method of claim 15, wherein the providing step further comprising providing, as the filler, a filler blend of carbon black and an ancillary filler selected from the group consisting of soy protein, soy flour, soy meal, soy hull, and combinations thereof.

18. The method of claim 16, wherein the step of compounding is carried out at a temperature of from 20 to 50 degrees Celsius.

* * * * *